(No Model.)
H. H. BROOKS.
FLEXIBLE METALLIC TUBE OR CONDUIT.
No. 591,092. Patented Oct. 5, 1897.
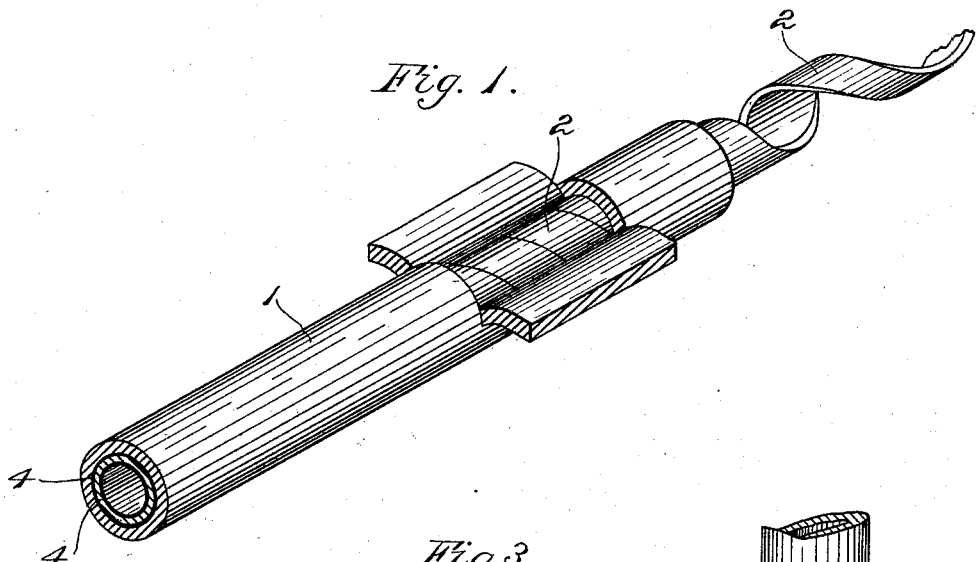
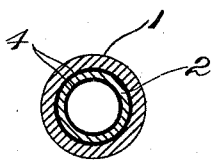
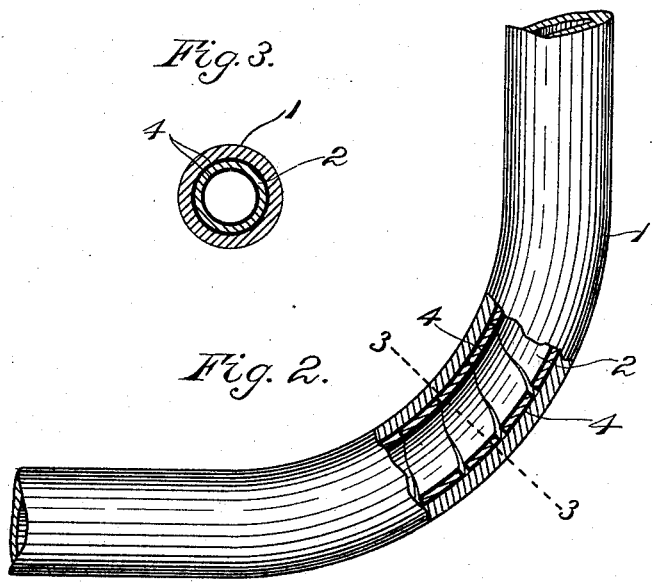
Witnesses:
Oscar F. Hill
Robert Wallace
Inventor:
Herbert H. Brooks
by Macleod Calver Randall
Attorneys.

UNITED STATES PATENT OFFICE.

HERBERT H. BROOKS, OF MEDFORD, MASSACHUSETTS.

FLEXIBLE METALLIC TUBE OR CONDUIT.

SPECIFICATION forming part of Letters Patent No. 591,092, dated October 5, 1897.

Application filed August 21, 1897. Serial No. 649,016. (No model.)

*To all whom it may concern:*

Be it known that I, HERBERT H. BROOKS, a citizen of the United States, residing at Medford, in the county of Middlesex and State of Massachusetts, have invented certain new and useful Improvements in Flexible Metallic Tubes or Conduits, of which the following is a specification, reference being had therein to the accompanying drawings.

Figure 1 of the drawings is a view in perspective of a short portion or length of a conduit or tube embodying the invention, a portion of the exterior thereof being shown as cut and turned back in order more clearly to show the construction and a portion of the spiral or inner tube being shown as drawn out at one end for the same purpose. Fig. 2 is a view of a portion of a tube or conduit embodying my invention, showing the same bent into curved form and with a portion thereof broken away or in section in order to illustrate the positions which are assumed by the parts when the tube or conduit is bent. Fig. 3 is a view in transverse section on the dotted line 3 3 of Fig. 2.

The invention relates more particularly to the conduits or tubes which in practice are employed to receive electrical wires or cables and protect them from injury. It is desirable that these conduits or tubes should be of such a character that they will not readily become indented or compressed or injured from without, as by the penetration of a nail or the like, that they should be capable of being bent in order to enable them to be placed in the desired positions, and that the bending should be effected without changing the cross-sectional shape of the interior space thereof. Such conduits or tubes commonly have been made of metal. Lead has been employed and has various practical advantages. This material, however, is soft, and tubes or conduits made therefrom are compressed and injured or punctured more or less readily, while in being bent into the desired curved form the sides thereof become flattened together more or less, thereby changing the cross-sectional shape of the interior space thereof, so that the conduit or tube will not accommodate as many wires or as large a cable in its curved portions as in its straight portions, while a number of wires or a cable or the like cannot readily be passed through the curved portions without binding and injury. It has been proposed to line leaden conduits or tubes in various manners. Tubes of stiff material have been used for the purpose of bracing the leaden tube or conduit and preventing it from becoming distorted and indented. When the said tube is of ordinary construction, while it may serve its purpose to prevent indentation or distortion throughout the straight portions of the tube or conduit, its use prevents the tube or conduit from being bent and also necessitates the construction of the straight portions of the tube or conduit in comparatively short lengths, which require subsequently to be joined together, while the curved portions require to be separately constructed in the exact form or curve which is needed for a given location.

My invention has for its object to provide a metallic tube or conduit, such as aforesaid, with a lining which while not interfering with the flexibility of the tube or conduit shall have the requisite stiffness and strength to prevent compression or indentation of the tube or conduit, shall prevent penetration or puncture of the tube or conduit by a nail or other pointed article, shall maintain the interior space of uniform cross-section at the places where the tube or conduit is required to be bent into curved form, and shall permit the tube or conduit to be constructed in long or continuous lengths, thus doing away with the necessity of frequent joints.

My invention has for another object to obviate injury to the insulating coatings or coverings of the wires or cables which are contained within the tubes or conduits aforesaid.

The invention will be described first with reference to the accompanying drawings, and afterward the distinguishing characteristics thereof will be particularly pointed out and distinctly defined in the claim at the close of this specification.

In the drawings, 1 designates a tube of flexible metal, such as lead, which may be of any desired thickness and diameter. 2 is the lining of the said tube. The said lining consists of sheet metal, such as steel, in the shape of a parallel-sided tape or ribbon formed into a close spiral, as shown. The edges of the successive convolutions of the said spiral are close together. The strip of sheet metal may be of any suitable width and thickness. It reinforces the tube 1 and prevents indentation or collapse thereof under a blow or pressure. It is impenetrable by a nail or other pointed article or instrument. A tube which has a continuous integral tubular lining will break if bent after bending to a slight extent, and such a tube if not lined will change its cross-sectional shape at the bend, whereas a flexible tube or conduit embodying my invention may be bent to any desired curve without breaking, and the lining herein described acts to keep the interior space of the tube substantially uniform in cross-section at the places where the tube is bent or curved, so that throughout such places the tube or conduit will accommodate as many wires or as large a cable as throughout its straight portions, thus permitting the said wires or cable, moreover, to be passed through such curved portions without binding or injury.

Fig. 3 shows the cross-sectional shape throughout the curve of a tube or conduit embodying my invention and bent into the form that is represented in Fig. 2, the former view representing a section on the line 3 3 of Fig. 2. The lining 2, composed of a strip or tape formed into a continuous spiral, resists the tendency of the tube 1 to become flattened or elliptical in cross-section on being bent, while at the same time it yields to permit the bending in consequence of the convolutions separating slightly, as at 3 3, Fig. 2, adjacent the longer or exterior curved wall of the tube or conduit 1.

The tube or conduit aforesaid may be employed for a variety of purposes where wires or the like are to be passed from point to point and require to be covered and protected.

4 is an insulating coating or covering on the spiral strip 2. This coating or covering preferably is in the form of an enamel. It serves not only effectually to insulate the strip 2 electrically, but it protects the same from moisture and preserves it from oxidation. Were it not for such insulating coating or covering the moisture which is condensed within the tube or conduit would cause the strip 2 to oxidize, and this would result in injury to the coatings or coverings of the wires or cable within the tube or conduit. The said coatings or coverings usually are composed in whole or part of india-rubber, (caoutchouc,) which deteriorates when acted upon by rust.

I claim as my invention—

The flexible metallic tube or conduit having a lining composed of a strip of sheet metal provided with an insulating coating or surfacing and formed into a spiral, substantially as described.

In testimony whereof I affix my signature in presence of two witnesses.

HERBERT H. BROOKS.

Witnesses:
CHAS. F. RANDALL,
WILLIAM A. COPELAND.